United States Patent [19]

Sailas

[11] 4,176,270
[45] Nov. 27, 1979

[54] ROLL AND ROLL-MANUFACTURING METHOD

[75] Inventor: Väinö Sailas, Vaajakoski, Finland
[73] Assignee: Valmet Oy, Helsinki, Finland
[21] Appl. No.: 805,460
[22] Filed: Jun. 10, 1977

Related U.S. Application Data

[63] Continuation-in-part of Ser. No. 802,316, Jun. 1, 1977, Pat. No. 4,104,773.

[30] Foreign Application Priority Data

Jun. 15, 1976 [FI] Finland ............................. 761730

[51] Int. Cl.² .............................................. B23K 9/00
[52] U.S. Cl. ............................................ 219/121 EM
[58] Field of Search ............ 219/76.1, 76.14, 121 EM, 219/121 LM

[56] References Cited

U.S. PATENT DOCUMENTS

| 1,942,304 | 1/1934 | Mylting | 219/76.14 X |
| 3,417,223 | 12/1968 | Steigerwald | 219/121 EM |

Primary Examiner—Bruce A. Reynolds
Assistant Examiner—Fred E. Bell
Attorney, Agent, or Firm—Steinberg & Blake

[57] ABSTRACT

A roll of the type which is used in paper machines has an inner roll body provided with an outer covering made up of a series of elongated strip portions which circumferentially surround the inner roll body while being distributed axially therealong and engaging each other. These strip portions are welded to each other and also may be welded to the inner roll body. The welding of the strip portions is carried out by way of an electron beam type of welding which can be oriented so as to achieve one or more of a number of different types of weld connections between the successive strip portions and, if desired between the strip portions and the inner roll body. Where the strip portions form part of an elongated strip which is helically wound onto the inner roll body, the welding by way of the electron beam can take place simultaneously with the winding of the strip onto the roll body, and by suitable controls the welding can be continuous welding or the welding may be applied at predetermined intervals to provide a discontinuous type of welding.

13 Claims, 2 Drawing Figures

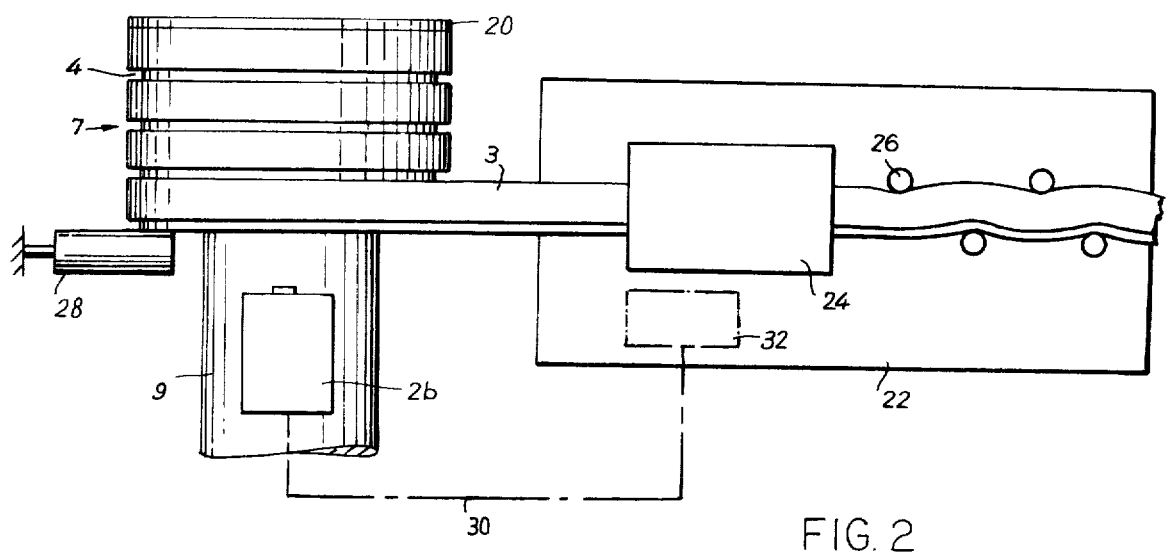
FIG. 2
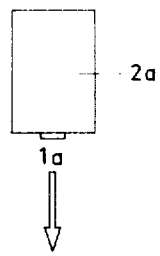
FIG. 1
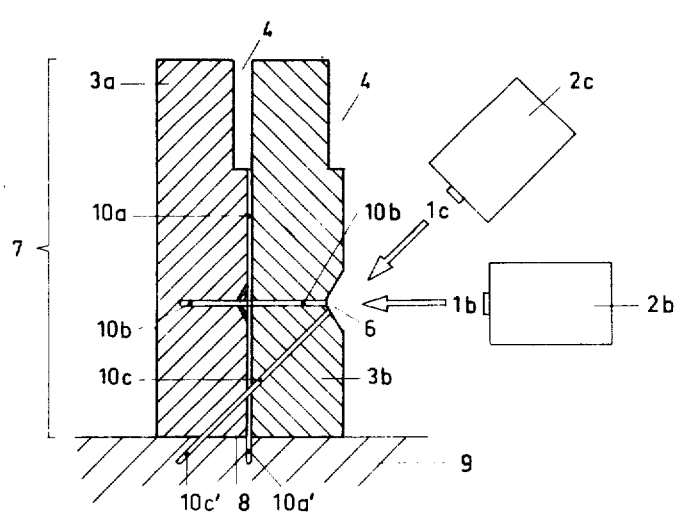

ROLL AND ROLL-MANUFACTURING METHOD

CROSS REFERENCE TO RELATED APPLICATION

This application is a continuation-in-part of application Ser. No. 802,316, filed June 1, 1977 now U.S. Pat. No. 4,104,773.

BACKGROUND OF THE INVENTION

The present invention relates to rolls of the type used in paper machines and in particular to methods for manufacturing such rolls.

As is well known, rolls of this type may include an inner roll body which is provided at an exterior surface with a covering in the form of an elongated strip which may be helically wound onto the roll body so as to surround the latter with a plurality of strip portions each of which extends circumferentially around the roll body and which are situated one next to the other axially along the roll body. The strip may be of a suitable profile so as to provide the covering for the roll with an exterior grooved surface of any desired characteristics, although the strip also may have a uniform thickness so that an ungrooved smooth-surfaced covering is provided for the roll. The roll body may be a solid body or it may be a hollow sleeve.

The elongated strip which is used to cover the roll body is preferably made of a corrosion-resistant material such as stainless steel, for example. The profile of the strip may be uniform so that the entire exterior surface of the roll provided by the outer surface of the strip may be either continuous or grooved, or the profile may be such that any desired combination of grooved and ungrooved exterior surface portions may be provided at the exterior of the finished roll.

Roll coverings in the form of a continuous strip wound onto a roll body or the equivalent thereof and intended for use in paper machines are known. For example reference may be made in this connection to U.S. Pat. No. 3,718,959, and also reference may be made to application Ser. No. 620,229 filed Oct. 6, 1975. Thus, roll-covering methods as disclosed in the above patent and application may also be utilized in the present application.

One of the problems encountered with rolls of the above type resides in the reliability with which the successive strip portions, each of which circumferentially surrounds the roll body, are fixed one to the next so that they will not tend to move apart from each other. Various expedients are known for the purpose of reliably fixing one circumferential strip portion to the next circumferential strip portion in a highly reliable manner which will serve to prevent these strip portions from moving apart from each other at least axially, and also which will prevent the strip portions from moving radially outwardly away from the inner roll body on which the strip portions are initially located.

Up to the present time reliance has been made on expedients such as providing the strip with a profile according to which one side surface of the strip has a groove and the opposed side surface thereof has a projection so that when such a strip is wound onto a roll body the projection of one turn is received in the groove of an adjoining turn, and thus through expedients of this type it has been attempted to provide a reliable connection of the successive strip portions to each other. Procedures of this latter type may be used in the present invention also.

SUMMARY OF THE INVENTION

It is a primary object of the present invention to provide a roll and roll-manufacturing method according to which the fixing of the successive strip portions which circumferentially surround the roll body to each other and if desired to the inner roll body can be carried out in a highly reliable manner which can be effected more quickly and which will achieve a more reliable fixing than was heretofore possible.

It is a further object of the present invention to provide a roll and roll-manufacturing method which may be used in addition to previously known or previously proposed expedients for locking successive strip portions to each other and to the roll body.

In accordance with the present invention, the inner roll body is provided at its exterior surface with a roll covering made up of a series of strip portions each of which circumferentially surrounds the roll body with the strip portions being situated in engagement with the exterior surface of the roll body as well as in engagement with each other while being axially distributed along the roll body. According to the present invention these strip portions are welded at least to each other, preferably by way of utilizing an electron-beam type of welding, so that in this way it is possible to achieve a roll having successive strip portions welded to each other, and in addition the manufacture of the roll can be carried out very quickly in a highly efficient manner while achieving an extremely reliable fixing of the successive strip portions one to the next and/or to the roll body.

BRIEF DESCRIPTION OF DRAWINGS

The invention is illustrated by way of example in the accompanying drawings which form part of this application and in which:

FIG. 1 is a schematic fragmentary sectional elevation of part of a roll of the invention while also illustrating the method of manufacture thereof, the section of FIG. 1 being taken in a plane which contains the axis of the roll; and FIG. 2 is a schematic top plan view for illustrating the method of the invention.

DESCRIPTION OF PREFERRED EMBODIMENTS

Referring now to the drawings, an inner roll body 9 is rotated about its axis as by being mounted on a suitable lathe, this body 9 being either solid or in the form of a hollow sleeve. As is shown in FIG. 2, the roll body 9 has a ring 20 fixed to one end thereof, and an elongated strip 3 of suitable profile is fixed, as by welding, at one end to the ring 20 so that as the inner roll body 9 is rotated about its axis the strip 3 will be pulled from any suitable source and wound helically onto the roll body 9 in the manner apparent from FIG. 2. The lathe has a carriage 22 which carries a suitable braking device 24 through which the strip 3 passes after travelling through a series of straightening rollers 26 which are also carried by the carriage 22. The braking device 24 is adjustable in a known way so as to provide for the strip 3 a suitable tension with which it is wound onto the inner roll body 9. Simultaneously with the winding of the strip 3 onto the roll body 9, the successive convolutions or strip portions which circumferentially surround the roll body 9 are pressed against each other by way of one or more pressure rolls 28, one of which is schematically illustrated in FIG. 2. These rolls 28 are supported in any suitable way so as to travel with the carriage 22 in a direction parallel to the axis of the roll body 9 in a well known manner.

In the above manner, which in itself as far as described above is well known, the roll body 9 is provided with the covering 7 which is fragmentarily illustrated in section in FIG. 1. Thus, as is shown in FIG. 1, successive strip portions 3a, 3b each of which circumferentially surrounds the roll body 9 are wound onto the latter and engage each other. In this way the side surfaces of the successive strip portions such as the strip portions 3a, 3b, come into engagement with each other to provide an interface between successive strip portions.

In the example illustrated, the profile of the strip 3 is such that at its upper right portion, as viewed in FIG. 1, it is formed with a shoulder 4, in this way providing the exterior surface of the finished roll with a continuous helical groove so that in this way the finished roll will have a grooved surface for enabling water to be received in the grooves at the exterior surface of the finished roll. However, it is to be understood that the thickness of the strip 3 may be uniform so that there will be no grooves and instead the exterior surface of the finished roll will be smooth. As is apparent from FIG. 1, the strip 3 has an inner edge surface 8 directly engaging the exterior surface of the inner roll body 9.

Also, in the example illustrated the strip 3 is formed longitudinally along one of its side surfaces with a continuous groove 6 which extends parallel to the inner side edge 8 of the strip 3. As will be apparent from the description below, this groove 6 is adapted to receive molten material of the strip which results from welding operations, this molten material of course solidifying and by becoming situated in the grooves preventing the successive windings or strip portions from spreading apart from each other.

Of course, the strip 3 also may be provided with grooves at its opposed side surfaces which come into register with each other and which receive in their interior an elongated interlocking member which, as shown in the above parent application, also acts as a seal and a barrier which will prevent water from travelling past the elongated interlocking member so that at the same time such an elongated interlocking member provides a barrier against corrosion.

In accordance with the present invention the successive windings or strip portions, such as the strip portions 3a, 3b, etc. are welded to each other and also, if desired to the body 9. In accordance with the invention, the welding is carried out by way of one or more electron guns, and FIG. 1 illustrates three electron guns 2a–2c in a schematic manner. FIG. 2 illustrates schematically how the electron gun 2b is supported by way of any suitable support means 30 on the carriage 22 for movement therewith, the carriage 22 also carrying a suitable control means 32 which is connected with any suitable source of energy and which serves to control the operation of the electron welding gun 2b.

Thus, any one or all of the electron guns shown in FIG. 1 form part of an electron beam welding apparatus. Each of the guns in a well known manner is capable of generating a powerful electron jet accelerated by an electrical field. Thus FIG. 1 illustrates the electron jets 1a–1c, in a schematic manner, respectively generated by the schematically illustrated electron guns 2a–2c. The electrons which are thus accelerated have a very high kinetic energy and a profound depth effect, so that the penetration of the welding is very great. The effect of the electron beam extends to an extent which is substantially deeper than could be achieved with other types of beams such as, for example, laser, plasma, or an electric arc. A further feature in connection with utilizing the electron beam type of welding of the present invention resides in the fact that the electron beam can be highly localized with respect to the cross section thereof so that it can be concentrated on an exceedingly small area, and in addition it is possible to automate the guiding of the beam in a simple manner.

FIG. 1 schematically illustrates three different ways in which the electron beam may be directed by way of any one of the electron guns shown in FIG. 1. Thus, the electron gun 2a is situated so as to direct the electron beam 1a radially into the interior of the groove 4 in the covering 7 and along the interface between adjoining turns or strip portions, so as to achieve in this way an exceedingly narrow weld seam 10a schematically indicated in FIG. 1. The penetration of the electron beam is such that the seam 10a can extend inwardly beyond the inner edge surface 8 and beyond the exterior surface of the body 9 into the interior thereof to provide for the weld seam an inner end 10a'. Thus by way of this welding operation it is possible to achieve the weld seam 10a, 10a', enabling not only the adjacent profiled strip turns or portions to be welded directly to each other but also to enable them to be welded to the inner roll body 9.

As is shown in FIG. 1, it is also possible to utilize an electron gun 2b which directs the electron beam 1b in a direction parallel to the axis of the inner roll body 9, substantially at right angles to the above described weld seam 10a, so that in this way there is produced a weld seam 10b which joins adjacent turns or strip portions to each other, with the melt resulting from this welding operation of course becoming situated in the groove 6 as pointed out above. Of course, the radial beam 1a also will provide a melt which in part at least will become situated in the groove 6. The gun 2b may be used either by itself or in addition to the gun 2a, so that either the single seam 10b may be provided or the latter seam may be provided together with the seam 10a, 10a'.

In addition it is possible to utilize the gun 2c which directs the electron beam 1c obliquely inwardly toward the axis of the inner roll body 9 in a plane which contains this axis, in the manner apparent from FIG. 1. Thus, by orienting the electron gun in the manner shown for the electron gun 2c of FIG. 1, it is possible to achieve a weld seam 10c which at its lower end can penetrate into the roll body 9 to form at its inner end the seam portion 10c', thus enabling by way of this seam not only directly welding the turns or strip portions to each other but also directly welding them to the inner roll body 9.

Of course, the above-described weld seam or weld seams 10a, 10b, 10c, may be provided either separately or together in any desired combination.

As is schematically indicated in FIG. 2, it is of advantage if the electron beam welding described above is carried out in immediate connection with and simultaneously with the winding of the profiled strip on the roll body 9. However, the electron beam welding need not be continuous in every case. Thus, it is possible by way of suitable controls, such as the control means 32 schematically shown in FIG. 2, to provide for a discontinuous type of welding in that electron gun can be controlled to deliver at suitable intervals and/or at desired points or locations a powerful electron pulse against the profiled strip 3. An operation of this type is very easy to provide by way of suitable automatic controls.

In connection with the operation of any one or more of the electron guns referred to above, it is important that the chamber of the gun be maintained at a suitable vacuum which preferably is on the order of $10^{-4}$ to $10^{-5}$ torr. On the other hand, in the working chamber of the electron gun, which is to say the chamber thereof which communicates with the object which is being welded, it is not absolutely essential to have such a high vacuum. It has been found from experience that in many cases it is possible to provide for satisfactory operation with a less intense vacuum, for example a so-called semi-vacuum on the order of $10^{-2}$ to $10^{-1}$ torr, or it is even possible to operate with atmospheric pressure (760 torr). In this latter event the workpiece must be situated very close to the electron gun.

One of the highly advantageous features of electron beam welding is that it can be carried out at an extremely high rate of speed, and because the beam can be directed and guided in an automatic and programmed manner, for example with the aid of suitable magnetic fields, the method of the invention for fixing the turns or strip portions to each other and/or to the roll body can be carried out simultaneously with the winding of the profile strip without causing or requiring any substantial slowing down in the operation of winding the strip onto the roll body.

Of course, the invention is not to be confined to the particular examples illustrated merely by way of example, and the details of the particular examples referred to above may vary within the scope of the inventive concept as defined by the claims which follow.

What is claimed is:

1. In a method of manufacturing a roll of the type which is used in a paper machine, comprising the steps of surrounding an inner roll body with a plurality of outer strip portions which are distributed along the axis of the roll body, which engage the exterior surface thereof, and each of which extends circumferentially around the roll body, each of said strip portions having side surfaces with the side surfaces of successive strip portions engaging each other defining an interface between adjacent strip portions so as to provide a covering which covers the entire exterior surface of said inner roll body, and welding the successive strip portions simultaneously to each other and to said roll body surface by an electron beam for preventing them from moving apart from each other at least in the direction of the axis of said inner roll body.

2. In a method as recited in claim 1 and wherein the successive strip portions form part of a single continuous strip which is helically wound onto the inner roll body, and welding the successive strip portions to each other simultaneously with the winding thereof onto the inner roll body.

3. In a method as recited in claim 1 and wherein the electron beam is applied to the successive strip portions at predetermined intervals for providing a discontinuous type of welding.

4. In a method as recited in claim 1 and wherein the electron welding is carried out with an electron beam at a predetermined pressure.

5. In a method as recited in claim 4 and wherein said pressure is a vacuum on the order of $10^{-4}$–$10^{-5}$ torr.

6. In a method as recited in claim 4 and wherein the pressure is on the order of $10^{-2}$–$10^{-1}$ torr.

7. In a method as recited in claim 4 and wherein the pressure is atmospheric pressure.

8. In a method as recited in claim 1 and wherein the electron beam is directed radially toward the axis of said inner roll body along said interface defined between successive strip portions where a pair of adjoining strip portions engage each other.

9. In a method as recited in claim 1 and wherein the electron beam is directed parallel to the axis of said inner roll body through one strip portion into the immediately preceding strip portion.

10. In a method as recited in claim 9 and wherein said strip portions are respectively formed at an outer side face with a groove for receiving a molten material resulting from the electron welding.

11. In a method as recited in claim 1 and wherein the electron beam is directed obliquely through one strip portion into the immediately preceding strip portion inwardly toward the axis of said inner roll body.

12. In a method as recited in claim 1 wherein said strip portions are each formed with a shoulder in one of the side surfaces thereof so that upon surrounding the inner roll body with said strip portions, a circumferentially extending groove is defined.

13. In a method as recited in claim 12 and wherein the electron beam is directed radially toward the axis of said inner roll body into said groove and along said interface defined between successive strip portions where a pair of adjoining strip portions engage each other.

* * * * *